May 20, 1930.     A. B. DIBNER     1,759,567
SLIDE JOINT FOR ELECTRICAL CONDUCTORS
Filed Sept. 7, 1928
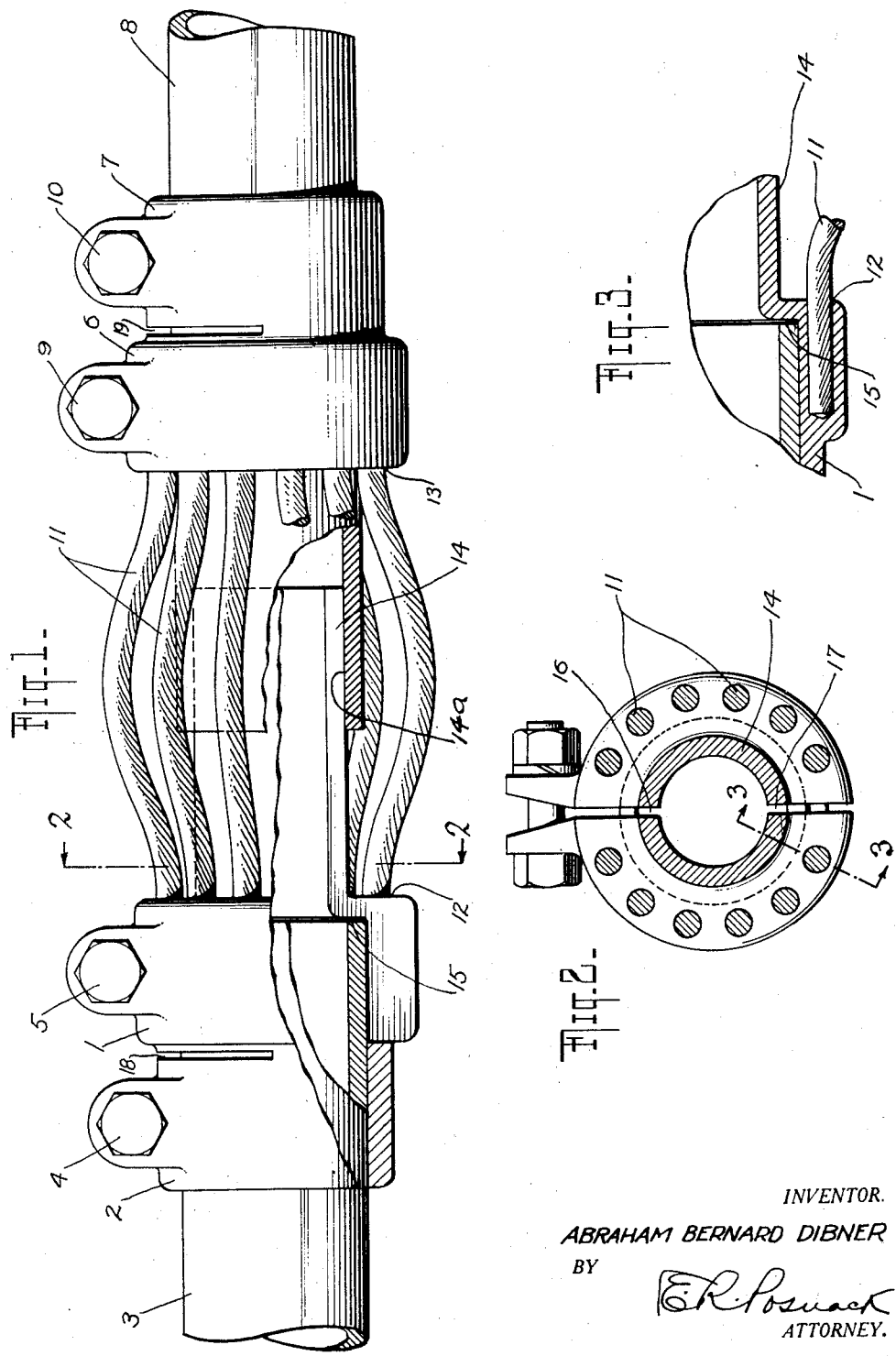
INVENTOR.
ABRAHAM BERNARD DIBNER
BY
ATTORNEY.

Patented May 20, 1930

1,759,567

UNITED STATES PATENT OFFICE

ABRAHAM BERNARD DIBNER, OF NEW YORK, N. Y.

SLIDE JOINT FOR ELECTRICAL CONDUCTORS

Application filed September 7, 1928. Serial No. 304,544.

This invention relates to slide joints for use with conductors that require a large degree of flexibility due to varying conditions, such as temperature changes, the settlement of foundations supporting electrical apparatus, electro-magnetic shock as a result of the operation of oil circuit breakers, and stresses produced by meteorologic factors, such as lightning and storm. Particularly is this invention applicable to the field of the electrical transmission of power, where conductors of relatively large diameters and lengths are employed, requiring considerable flexibility.

Hence the primary object of this invention is to provide an electrical slide joint that will absorb the stresses produced by the conditions above referred to, and that will permit of the necessary adjustments of length and position, and at the same time allow the full line current to be carried by the joint.

Another object of my invention is to provide a construction capable of easy manufacture and simple installation, and of adequate mechanical strength to support the conductor length.

Referring to the drawings,

Figure 1 is a side and partial sectional elevation of the slide joint and conductors constituting my invention.

Figure 2 is a cross section of the joint in Figure 1 along the line 2—2.

Figure 3 is a section along line 3—3 of Figure 2.

In the drawings, the slide clamping member consisting of clamps 1 and 2 is secured to conductor 3 by means of the bolts 4 and 5; and the clamping member consisting of the clamps 6 and 7 is secured to the conductor 8 by means of the bolts 9 and 10. The flexible conducting elements 11, which are usually of braided copper cable, are attached to the clamps by means of soldering the terminals of these elements into the sockets 12 and 13. Attached to clamp 1, or as shown in the drawing, integrally cast therewith, is the extension or slide 14 extending into the open end of the conductor 8. The shoulder 15 within the opening of clamp 1 constitutes the stop against which the end of conductor 3 abuts.

The slide 14 contains two longitudinal slots 16 and 17 which extend throughout the length of the clamp 1. The clamps 1 and 2 are partially separated by the slit 18; and the clamps 6 and 7 by the slit 19.

In installing this device, the clamps 1 and 2 are slipped over the end of conductor 3 until the said end abuts against the shoulder 15, after which the bolts are clamped down. In like manner, the clamps 6 and 7 are secured to the conductor 8, the position of these clamps depending upon the expected expansion and contraction, which depend upon the season of installation and other variable elements. When the joint is thus installed, any variation in position that may be imposed upon either of the conductors will be taken up by the movement of the slide 14 along the surface 14ª within the conductor 8. The position of the slide 14 within the conductor 8 can be adjusted to provide such a supporting area as will be adequate for the weight and length of conductor used.

The use of the flexible cable 11 is to the advantage of greatest flexibility in all directions, so that any circumferential variations of relative conductor positions will be absorbed by these cables, which is virtually impossible in semi-rigid forms such as straps or springs. The danger of crystallization which is always present in the semi-rigid forms referred to, is also removed by the use of flexible cable.

The slots 16 and 17 make possible the fullest clamping of the clamp 1 about the conductor 3. The slits 18 and 19 permit of independent and separate adjustment of the clamps 1, 2, 6, and 7.

Although the drawings illustrate the conductors 3 and 8 as being of the tube type, conductors frequently are shaped as bars and rods of other forms. In this connection it should be noted that this slide joint can be designed for use with conductors of such other forms, and that various other modifications can be made without in any way affecting the scope of my invention.

What I claim is:

1. A slide joint for hollow electrical conductors comprising two electrically connected clamping members each adapted for attachment to one end of two adjacent electrical conductors, and a slide attached to one of said members and adapted to slidably move within the hollow end of the adjacent conductor.

2. A slide joint for hollow electrical conductors comprising a pair of hollow conductors, a clamping member secured to the end of one of said conductors, a slide attached to said clamping member and slidably extending into and supported by the hollow end of the other of said conductors, a second clamping member secured to said latter conductor, and a plurality of flexible conducting elements positioned about said conductors and electrically connected to said clamping members.

3. A slide joint for electrical conductors comprising a pair of hollow conductors, a clamping member secured to the end of one of said conductors and having integral therewith an extension in slidable engagement with the end of the other conductor, a plurality of flexible cables and means to electrically connect the said cables with the said conductors.

4. In a slide joint for hollow electrical conductors a slide clamp comprising a clamping portion and a slide portion, said clamping portion having an opening containing a stop therein adapted to receive the end of a conductor, the said slide portion being slotted longitudinally and adapted to slidably engage the end of an adjacent conductor.

5. A slide joint for electrical conductors comprising a pair of hollow conductors, two sets of electrically connected clamping members, each set comprising a plurality of clamps, said sets being secured to the adjacent ends of the said electrical conductors; a slide attached to one of said sets in slideable engagement with the end of one of said hollow conductors; and a plurality of flexible cables electrically connecting together said sets of clamping members.

6. In a slide joint for hollow electrical conductors, a slide clamping member comprising a plurality of clamps in longitudinal alinement and a slide portion attached to an end clamp; all of said clamps having an opening running therethrough for receiving the end of a conductor, said slide portion being adapted to slideably engage the end of an adjacent conductor and having a slot running through the length thereof and extending through the length of said end clamp.

In testimony whereof I affix my signature.

ABRAHAM BERNARD DIBNER.